US008340193B2

(12) United States Patent
Lu et al.

(10) Patent No.: US 8,340,193 B2
(45) Date of Patent: Dec. 25, 2012

(54) WYNER-ZIV AND WAVELET VIDEO CODING (75) Inventors: Yan Lu, Beijing (CN); Xun Guo, Beijing (CN); Feng Wu, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1662 days.

(21) Appl. No.: 11/462,580

(22) Filed: Aug. 4, 2006

(65) Prior Publication Data
US 2008/0031344 A1 Feb. 7, 2008

(51) Int. Cl.
  *H04N 7/12* (2006.01)
  *H04N 11/02* (2006.01)
  *H04N 11/04* (2006.01)
  *G06K 9/36* (2006.01)
  *G06K 9/46* (2006.01)
(52) U.S. Cl. .............. 375/240.19; 382/232; 382/240
(58) Field of Classification Search .............. 375/240.19
  See application file for complete search history.

(56) References Cited

U.S. PATENT DOCUMENTS

| | | | |
|---|---|---|---|
| 5,144,423 A | 9/1992 | Knauer et al. | |
| 5,412,741 A * | 5/1995 | Shapiro .................. | 382/232 |
| 5,719,632 A | 2/1998 | Hoang et al. | |
| 5,818,536 A | 10/1998 | Morris et al. | |
| 5,854,658 A | 12/1998 | Uz et al. | |
| 5,862,450 A | 1/1999 | Mandal et al. | |
| 6,018,303 A | 1/2000 | Sadeh | |
| 6,122,320 A | 9/2000 | Bellifemine et al. | |
| 6,157,746 A * | 12/2000 | Sodagar et al. .............. | 382/240 |
| 6,275,532 B1 | 8/2001 | Hibi et al. | |
| 6,289,049 B1 | 9/2001 | Kim et al. | |
| 6,498,810 B1 | 12/2002 | Kim et al. | |
| 6,526,097 B1 | 2/2003 | Sethuraman et al. | |
| 6,542,549 B1 | 4/2003 | Tan et al. | |
| 6,628,712 B1 | 9/2003 | Le Maguet | |
| 6,717,990 B1 | 4/2004 | Abousleman | |
| 6,735,249 B1 | 5/2004 | Karczewicz et al. | |
| 6,920,175 B2 | 7/2005 | Karczewicz et al. | |
| 6,947,486 B2 | 9/2005 | Akhan et al. | |
| 7,003,035 B2 | 2/2006 | Tourapis et al. | |
| 7,031,389 B2 | 4/2006 | Guevorkian et al. | |
| 7,233,269 B1 | 6/2007 | Chen et al. | |

(Continued)

FOREIGN PATENT DOCUMENTS

EP  0971542  1/2000

(Continued)

OTHER PUBLICATIONS

Aaron et al., "Transform-domain Wyner-Ziv Codec for Video", Proc. SPIE 2004, pp. 520-528.*

(Continued)

*Primary Examiner* — Christopher S Kelley
*Assistant Examiner* — Hee-Yong Kim
(74) *Attorney, Agent, or Firm* — Lee & Hayes, PLLC (57) ABSTRACT

Wyner-Ziv and wavelet video coding is described. In one aspect, Wyner-Ziv frames from multiple frames of source video content are zero-tree entropy encoded to generate encoded Wyner-Ziv content. The zero-tree entropy encoding operations are based on high-order statistical correlations among wavelet transforms from the Wyner-Ziv frames. The encoded Wyner-Ziv content is communicated to a decoder for decoding to generate reconstructed Wyner-Ziv frames for presentation to a user.

12 Claims, 4 Drawing Sheets

U.S. PATENT DOCUMENTS

| | | |
|---|---|---|
| 7,256,716 B2 | 8/2007 | Liu et al. |
| 7,418,037 B1 | 8/2008 | Nie et al. |
| 2003/0123540 A1 | 7/2003 | Zhong et al. |
| 2003/0151753 A1 | 8/2003 | Li et al. |
| 2003/0156644 A1 | 8/2003 | Song et al. |
| 2004/0039571 A1 | 2/2004 | Bruekers et al. |
| 2004/0114684 A1 | 6/2004 | Karczewicz et al. |
| 2004/0172478 A1 | 9/2004 | Jacobs et al. |
| 2005/0013371 A1 | 1/2005 | Yim et al. |
| 2005/0024487 A1 | 2/2005 | Chen |
| 2005/0036550 A1 | 2/2005 | Koba et al. |
| 2005/0047508 A1 | 3/2005 | Ha et al. |
| 2005/0084014 A1 | 4/2005 | Wang et al. |
| 2005/0105815 A1 | 5/2005 | Zhang et al. |
| 2005/0201468 A1 | 9/2005 | Tsai et al. |
| 2005/0232360 A1 | 10/2005 | Byun |
| 2005/0268200 A1 | 12/2005 | Garudadri et al. |
| 2006/0008006 A1 | 1/2006 | Cha et al. |
| 2006/0062299 A1 | 3/2006 | Park et al. |
| 2006/0072662 A1 | 4/2006 | Tourapis et al. |
| 2006/0197686 A1 | 9/2006 | Liu et al. |
| 2006/0197690 A1 | 9/2006 | Liu et al. |
| 2006/0200733 A1 | 9/2006 | Stankovic et al. |
| 2007/0013561 A1 | 1/2007 | Xu et al. |
| 2007/0014356 A1 | 1/2007 | Han et al. |
| 2007/0041652 A1 | 2/2007 | Budge et al. |
| 2007/0133690 A1 | 6/2007 | Xin et al. |
| 2007/0165717 A1 | 7/2007 | Ye |
| 2007/0217541 A1 | 9/2007 | Liu et al. |
| 2008/0189073 A1 | 8/2008 | Jagmohan et al. |
| 2008/0219351 A1 | 9/2008 | Kim et al. |

FOREIGN PATENT DOCUMENTS

| | | |
|---|---|---|
| WO | WO2005043882 A2 | 5/2005 |

OTHER PUBLICATIONS

Final Office Action for U.S. Appl. No. 11/457,705, mailed on May 19, 2011, Yan Lu, "Encoding Visual Data with Computation Scheduling and Allocation".

Adikari, et al., "A Sequential Motion Compensation Refinement Technique for Distributed Video Coding of Wyner-Ziv Frames", Image Processing, 2006 IEEE International Conference: IEEE Cot. 2006, pp. 597-600.

Adikari, et al., "Wyner-Ziv Coding with Temporal and Spatial Correlations for Motion Video", Electrical and Computer Engineering, 2006, CCECE 2006, IEEE May 2006, pp. 1188-1191.

Office Action for U.S. Appl. No. 12/047,317, mailed on Oct. 18, 2011, Yan Lu, "Wyner-Ziv Coding with Multiple Side Information", 10 pgs.

Artigas, et al., "A Model-Based Enhanced Approach To Distributed Video Coding", Technical University of Catalonia, 4 pages, 2005.

Fowler, et al., "Wavelet-based Distributed Source Coding of Video", 4 pages, 2005.

Girod, et al., "Distributed Video Coding", Proc. IEEE, Special Issue on Advances in Video Coding and Delivery, 12 pages, Jan. 2005.

"Source Coding", http://www.irisa.fr/temics/research/coding.php, printed on Apr. 25, 2006, 6 pages.

Wu, et al., "Multiple Description Image Coding with Distributed Source Coding and Side Information", SPIE Multimedia Systems and Applications VII, Mitsubishi Electric Research Laboratories, Inc., Dec. 2004, 10 pages.

Office Action for U.S. Appl. No. 11/460,217, mailed on Feb. 22, 2012, Yan Lu, "Bitstream Switching in Multiple Bit-Rate Video Streaming Environments", 5 pgs.

Office Action for U.S. Appl. No. 11/457,705, mailed on Apr. 18, 2012, Yan Lu, "Encoding Visual Data with Computation Scheduling and Allocation", 12 pgs.

Aaron et al., "Compression with Side Information Using Turbo Codes", Proc. of Data Compression Conf (DCC 02), Apr. 2002, Utah, 10 pgs.

Aaron, et al., "Towards Practical Wyner-Ziv Coding of Video" Available from http://ieeexplore.ieee.org/iel5/8824/27938/01247383.pdf?isNumber, 2003.

Aaron, et al., "Transform-domain Wyner-Ziv Codec for Video", available at least as early as Jun. 4, 2007, at <<http://citeseer.ist.psu.edu/cache/papers/cs/31531/http:zSzzSzwww.standford.eduzSz~bgirodzSzpdfszSzAaronVCIP04.pdf/transform-domain-wyner-ziv.pdf>>, 9 pgs.

Aaron et al., "Wyner-Ziv Coding of Motion Video", Proc. Asilomar Conf on Signals and Systems, California, Nov. 2002, 5 pgs.

Aaron, et al., "Wyner-Ziv Video Coding with Hash-Based Motion Compensation at the Receiver", International Conference on Image Processing (CIP), 2004, pp. 3097-3100.

Adikari, et al., "Side Information Improvement in DVC with Two Side Information Streams and 3D Motion Refinement," retrieved at <<http://ieeexplore.ieee.org/iel5/4232658/4232659/04232674.pdf?isnumber=4232659&prod=CNF&arnumber=4232674&arSt=32&ared=35&arAuthor=Adikari%2C+A.+B.+B.%3B+Fernando%2C+W.+A.+C.%3B+Weerakkody%2C+W.+A.+R.+J.&htry=1>>, IEEE, 2007, pp. 32-35.

Barron, et al., "The Duality Between Information Embedding and Source Coding with Side Information and Some Applications", available at least as early as Jun. 4, 2007, retrieved at <<http://allegro.mit.edu/pubs/posted/journal/2003-barron-chen-wornell-it.pdf>>, IEEE Transactions on Information Theory, vol. 49, No. 5, May 2003, pp. 1159-1180.

Berrou, et al., "Near Shannon Limit Error-Correcting Coding and Decoding:Turbo-Codes (1)", Proc. IEEE International Conference on Communications, Geneva, Switzerland, May 1993, pp. 1064-1070.

Chen et al., "Fast Integer Pel and Fractional Pel Motion Estimation for JVT", JVT-FO17, 6th Mtg, Japan, Dec. 2002, 14 pgs.

Chen et al, "Rate Control for Streaming Video over Wireless", Proc. INFOCOM 2004, Hong Kong, China, Mar. 2004, 6 pgs.

Dalai, et al., "Improving Turbo Codec Integration in Pixel-Domain Distributed Video Coding," available at least as early as Nov. 5, 2007, at <<http://www.discoverdvc.org/publications/IST/DLP_ICASSP06.pdf>>, 4 pgs.

Divsalar, et al., "Multiple Trellis Coded Modulation (MTCM)," IEEE Transactions on Communications, vol. 36, No. 4, Apr. 1988, pp. 410-419.

Guo et al., "Dependency Modeling in Multiple Bit-Rate Video Streaming Using Wyner-Ziv Coding", ICIP, 2006, 5 pgs.

Guo et al, "Free Viewpoint Switching in Multi-View Video Streaming Using Wyner-Ziv Video Coding", SPIE Visual Communications and Image Processing, Jan. 2006, 8 pgs.

He et al., "Power-Rate-Distortion Analysis for Wireless Video Communication under Energy Constraints", IEEE Trans. on Circuits and Systems for Video Technology, vol. 15, May 2005, 13 pgs.

Karczewicz et al., "The SP- and SI-Frames Design for H.264/AVC", IEEE Trans. on Circuits and Systems for Video Technology, vol. 13, No. 7, Jul. 2003, 8 pgs.

Liu, et al., "Wyner-Ziv Video Coding Using LDPC Codes", IEEE, 2006, pp. 258-261.

Martucci et al., "Zerotree Entropy Coding of Wavelet Coefficients for Very Low Bit Rate Video", ICIP 1996, Swizerland, Sep. 1996, 4 pgs.

Pradhan et al., "Distributed Source Coding Using Syndromes (DISCUS): Design and Construction", IEEE Trans. on Information Theory, vol. 49, No. 3, Mar. 2003, 18 pgs.

Pu et al., "Joint Power-Distortion Optimization on Devices with MPEG-4 AVC/H.264 Codec", Proc. ICC 2006, Turkey, Jun. 2006, 6 pgs.

Puri et al., "PRISM: A New Robust Video Coding Architecture Based on Distributed Compression Principles", Proc. 40th Allerton Conf on Communication, Control, and Computing, Illinois, Oct. 2002, 10 pgs.

Puri et al., "PRISM: A Reversed Multimedia Coding Paradigm", IEEE Int. Conf. Image Processing, Spain, 2003, 4 pgs.

Rowitch et al., "On the Performance of Hybrid FEC/ARQ Systems Using Rate Compatible Punctured Turbo (RCPT) Codes", IEEE Trans. on Communications, vol. 48, No. 6, Jun. 2000, 12 pgs.

Slepian, et al., "Noiseless Coding of Correlated Information Sources", IEEE Transactions on Information Theory, vol. IT-19, No. 4, Jul. 1973, pp. 471-480.

Sun et al., "Efficient and Flexible Drift-Free Video Bitstream Switching at Predictive Frames" Available from http://research.microsoft.com/~fengwu/papers/switching_icme_02.pdf, 2002.

Sun et al., "Seamless Switching of Scalable Video Bitstreams for Efficient Streaming" Available from http://research.microsoft.com/~fengwu/papers/switch_mm_04.pdf, 2004.

Sun et al., "The Improved SP Frame Coding Technique for the JVT Standard", Proc. IEEE ICIP 2003, vol. 3, Spain, Sep. 2003, 4 pgs.

Vleeschouwer, et al., "Motion Estimation for Low Power Video Devices", IEEE, 2001, pp. 953-956.

Wang, et al., "Wzs: Wyner-Ziv Scalable Predictive Video Coding" Available at http://www.ece.ucdavis.edu/PCS2004/pdf/ID110_pcs04.pdf, 2004.

Westerlaken, et al., "Turbo-Code Based Wyner-Ziv Video Compression", available at least as early as Jun. 4, 2007, at <<http://ict.ewi.tudelft.nl/pub/ronald/RPWesterlakenWic2005.pdf>>, 8 pgs.

Wiegand et al., "Overview of the H.264/AVC Video Coding Standard", IEEE Trans. on Circuits and Systems for Video Technology, vol. 13, No. 7, Jul. 2003, 19 pgs.

Wyner, et al., "The Rate-Distortion Function for Source Coding with Side Information at the Decoder", IEEE Transactions on Information Theory, vol. IT-22, No. 1, Jan. 1976, pp. 1-10.

Yang et al., "A Framework for Fine-Granular Computational-Compleity Scalable Motion Estimation", Proc. IEEE, ISCAS 2005, vol. 6, May 2005, 4 pgs.

Yang, et al., "Adaptive Key Frame Selection Wyner-Ziv Video Coding", pp. 4, 2005.

Yang, et al., "Wyner-Ziv Coding Based on TCQ and LDPC Codes", IEEE, 2003, pp. 825-829.

Zamir, et al., "Nested Linear/Lattice Codes for Structured Multiterminal Binning", IEEE Transactions on Information Theory, vol. 48, No. 6, Jun. 2002, pp. 1250-1276.

Zhao, et al., "Complexity Management for Video Encoders", 3 pages, 2002.

Zhao, et al., "Computational Complexity Management of Motion Estimation in Video Encoders", Proceedings of the Data Compression Conference, IEEE, 2002, 1 page.

* cited by examiner

WYNER-ZIV AND WAVELET VIDEO CODING

BACKGROUND

In traditional video coding schemes, asymmetric complexity exists in the encoder and decoder operations. Motion estimation, which is generally very time-consuming due to correlation exploration operations, typically dominates operational complexity of the encoder. Correlation exploration operations include temporal, spatial, and statistical correlations. Conventional distributed video coding (DVC) systems use temporal correlation at the decoder, for example, by generating a side information frame from neighboring intra-coded frames. Spatial correlation within Wyner-Ziv frames is generally utilized by performing DCT or wavelet transforms. Some channel coding algorithms, for example, such as turbo codes for DVC use statistical correlations. However, these conventional systems do not utilize high-order statistical correlations among transform coefficients in DVC scenarios.

SUMMARY

Wyner-Ziv and wavelet video coding is described. In one aspect, Wyner-Ziv frames from multiple frames of source video content are zero-tree entropy encoded to generate encoded Wyner-Ziv content. The zero-tree entropy encoding operations are based on high-order statistical correlations among wavelet transforms from the Wyner-Ziv frames. The encoded Wyner-Ziv content is communicated to a decoder for decoding to generate reconstructed Wyner-Ziv frames for presentation to a user.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

High-order correlations among transform coefficients indicate that distribution of a transform coefficient is correlated with some other transform coefficients. For example, a transform coefficient may have a large probability to be zero, when its neighboring transform coefficients are also zero. Since this probability is defined in the sense of statistics over a large amount of data, it is also denoted as high-order statistical correlations. High-order statistical correlations can be utilized in image and video coding by jointly encoding multiple transform coefficients. In a special case, each transform coefficient can be encoded individually. In this scenario, 0-order statistical correlations are utilized. Compared with the high-order statistical correlation, 0-order statistical correlations are considered low-order statistical correlations.

In hybrid video coding schemes such as MPEG-2, which is not a DVC scheme, run-length coding operations leverage high-order statistical correlations, wherein consecutive transform coefficients with zero value are jointly encoded as a single symbol. However, run-length coding is not typically used in DVC schemes. This is because run-length coding reorganizes transform coefficients and generates a number of new symbols that depend on distribution of the re-organized transform coefficients. In DVC, and prior to decoding, transform coefficients of a side information frame are reorganized to comply with symbols generated at the encoder. The decoding process pre-processes side information. This pre-processing uses information that can only be achieved after the decoding process. As a consequence, run-length coding and high-order statistical correlations among transform coefficients are not used in conventional DVC schemes. However, high-order statistical correlation plays a significant role in entropy coding of Wyner-Ziv frames. For example, utilization of high-order statistical correlation can lower the theory bound of entropy, which makes it possible to further lower encoding bit-rates.

In contrast to such conventional techniques, the systems and methods described below in reference to FIGS. 1-4 use high-order statistical correlations among transform coefficients in a DVC architecture to zero-tree entropy (ZTE) encode Wyner-Ziv frames. Specifically, the systems and methods include an encoder that codes Wyner-Ziv frames using turbo codes. The transform coefficients are quantized using scalar quantization and reorganized into wavelet trees to exploit high-order statistical correlations among the transform coefficients. Then, significant coefficients are identified and coded for transmission of punctured parity bits to a decoder of the systems and methods. The decoder extracts corresponding coefficients from side information, which is generated from surrounding intra frames with motion-compensated prediction, according to a significance map. The decoder uses these extracted coefficients to reconstruct (decode) the Wyner-Ziv frame for presentation to a user. By employing the zero-tree scanning process at both the encoder and the decoder, coefficients of the side information frame are extracted with a same structure as extracted from an original frame at the encoder, which is significant for turbo decoding.

These and other aspects of Wyner-Ziv and wavelet video coding are now described in greater detail.

An Exemplary System

Although not required, Wyner-Ziv and wavelet video coding is described in the general context of computer-executable instructions (program modules) being executed by computing devices such as a general-purpose computer or a mobile handheld device. Program modules generally include routines, programs, objects, components, data structures, etc., that perform particular tasks or implement particular abstract data types. While Wyner-Ziv and wavelet video coding is described in the foregoing context, acts and operations described hereinafter may also be implemented in hardware.

Figure 1:
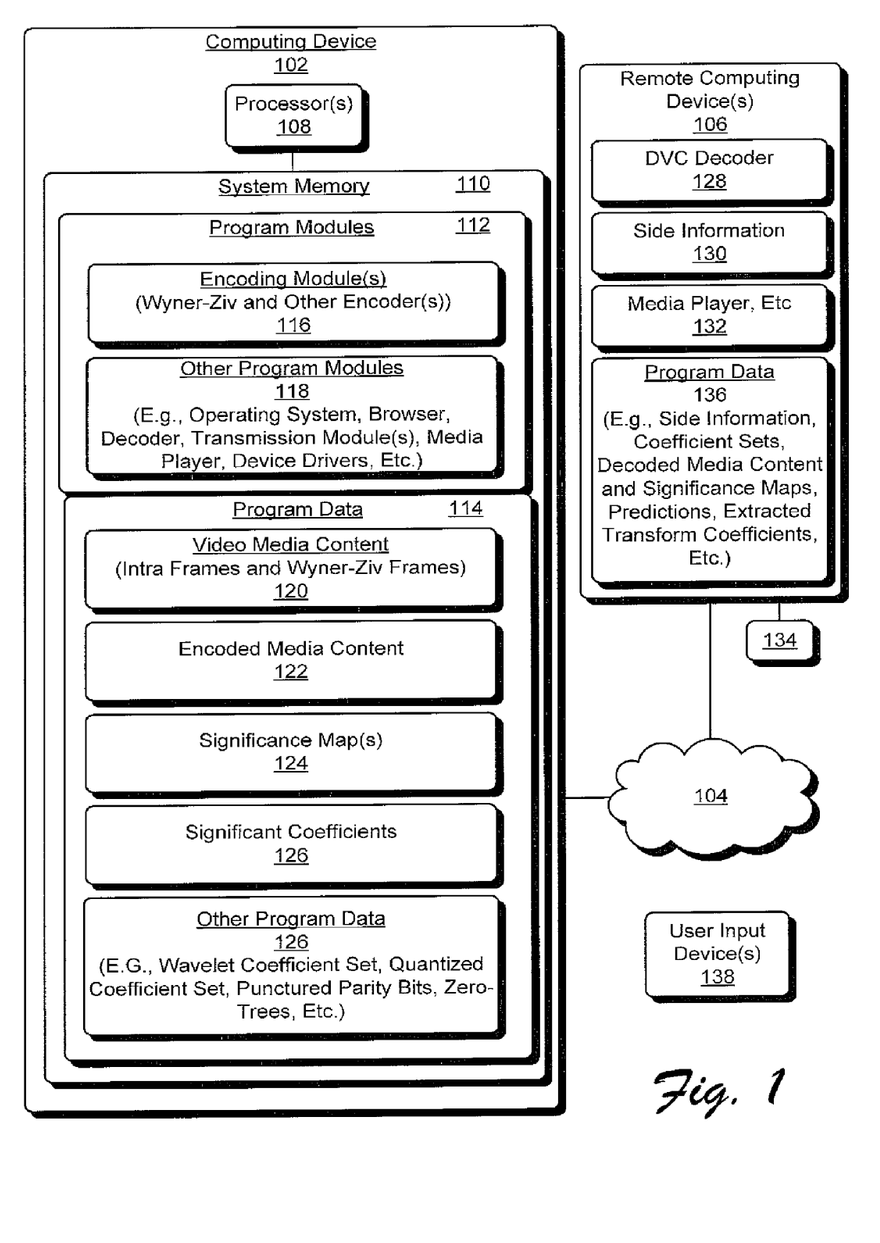
FIG. 1 shows an exemplary system for Wyner-Ziv and wavelet video coding, according to one embodiment.

FIG. 1 shows an exemplary system 100 for Wyner-Ziv and wavelet video coding, according to one embodiment. System 100 includes computing device ("client") 102 coupled across network 104 to one or more remote computing devices 106. Network 104 may include any combination of a local area network (LAN) and a general wide area network (WAN) communication environments, such as those which are commonplace in offices, enterprise-wide computer networks, intranets, and the Internet. Each computing device 102 and 106 includes a respective processor coupled to a system memory. Each processor is configured to fetch and execute computer-program instructions stored in system memory to perform respective asymmetric operations associated with Wyner-Ziv and wavelet video coding (i.e., encoding or decoding operations).

For example, client 102 includes processor 108 coupled to system memory 110. System memory 110 includes program modules 112 and program data 114. In this implementation, program modules 112 include, for example, distributed video coding (DVC) encoding module 116 and other program modules 118 such as an operating system (OS) to provide a runtime environment, one or more encoded video transmission modules, a browser to search for media content, a decoder, a media player, and/or so on.

Encoding module ("encoder") 116 encodes video media content 120 using two different encoding schemes to generate encoded media content 122. Video media content 120 ("media content") is an input video sequence including multiple image frames classified using known techniques into two categories: Intra frames (intra frames) and Wyner-Ziv frames. Both intra frames and Wyner-Ziv frames are individually encoded. However, an intra-coded frame is also individually decoded at the decoder side, whereas a Wyner-Ziv coded frame is decoded with some side information frame generated from the neighboring decoded frames. Encoder 116 uses a first encoding algorithm to encode all intra-coded frames of media content 120 for communication and reconstruction (decoding) by decoder 128. In this implementation, the first encoding algorithm is a traditional discrete cosine transform (DCT) based intra coding method such as one based on H.264 encoding.

Encoder 116 uses a second encoding algorithm to encode the Wyner-Ziv frames of media content 120. Specifically, encoder 116 compresses each Wyner-Ziv ("WZ") frame X using discrete wavelet transforms (DWTs) to exploit statistical correlations among transform coefficients, and therefrom, generate a significance map 124 that identifies significant ones of the coefficients. Encoder 116 entropy encodes the significance map and transmits the encoded map in intra-coding mode to decoder 128 for generating side information 130 to reconstruct (decode) X. (The encoded significance map 124 is represented as a respective portion of encoded media content 122). Encoder 116 also turbo codes significant coefficients 126 to generates punctured parity bits from significant coefficients 126. In this implementation, encoder 116 allocates appropriate bits of X for transmission of corresponding parity bits, using a standard request bits feedback channel with decoder 128. In addition to the significance map 124, encoder 116 also sends these parity bits to decoder 128 for reconstruction of X. Thus, the bit-stream of a coded Wyner-Ziv frame is composed of the bits for significance map $X_m$ and the parity bits $X_b$ from the Wyner-Ziv encoder.

Figure 2:
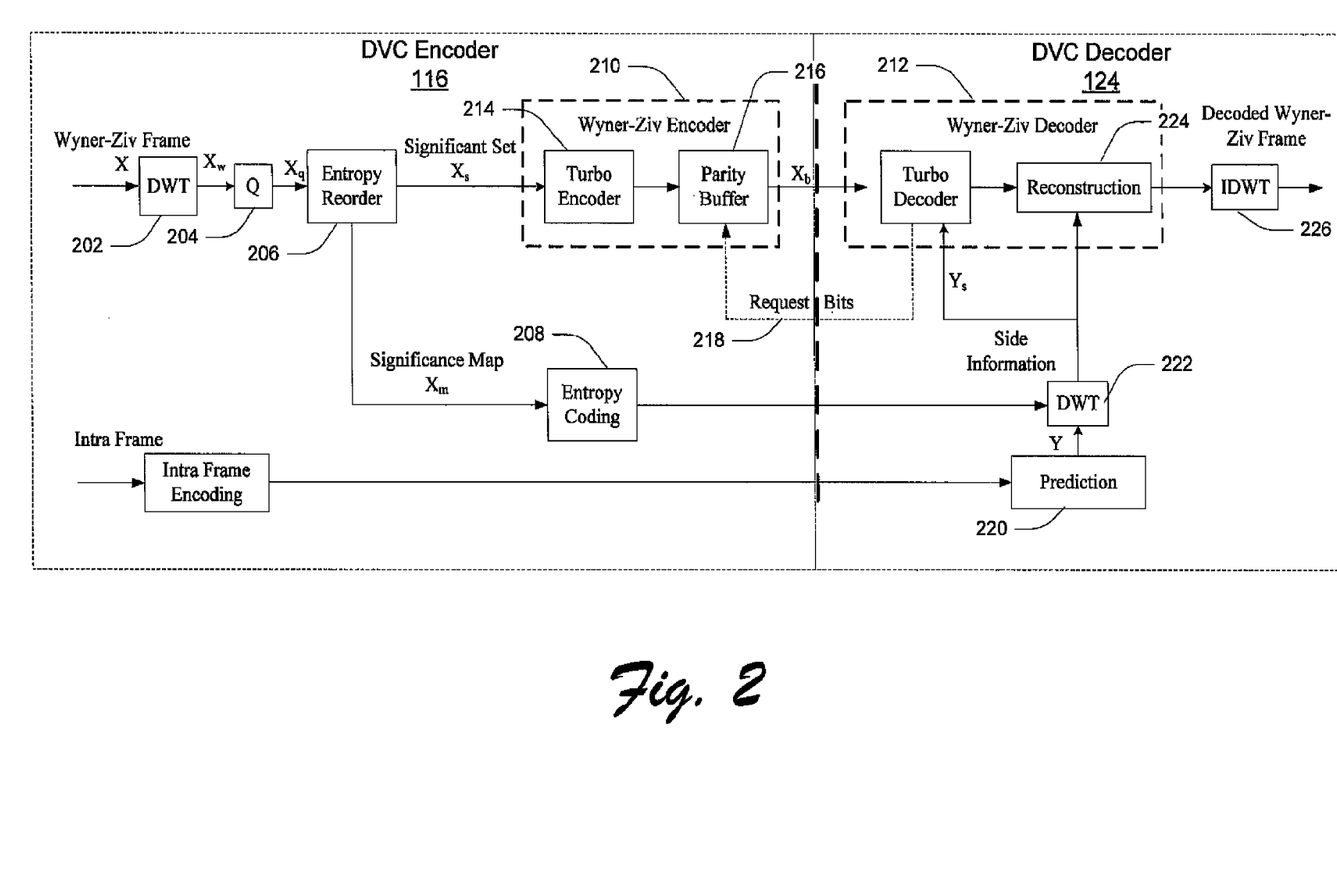
FIG. 2 shows an exemplary Wyner-Ziv and wavelet video codec architecture, according to one embodiment.

In one implementation, Wyner-Ziv coder 210 implements a rate-compatible punctured turbo code (RCPT) to generate the punctured parity bits. Such an RCPT, for example, is described by D. Rowitch and L. Milstein, "*On the performance of hybrid FEC/ARQ systems using rate compatible punctured turbo codes,*" *IEEE Transactions on Communications*, vol. 48, no. 6, pp 948-959, June 2000.

Decoder 128, responsive to receiving encoded intra-coded frames from encoder 116, reconstructs the encoded intra-coded frames using a conventional decoding technique. In this implementation, these reconstructed frames are presented by media player 132 to a user via display device 134. For each encoded WZ frame received by decoder 128, decoder 128 reconstructs a corresponding WZ frame X as follows. In this implementation, decoder 128 generates side information 130 ("Y") using frame interpolation by predicting X from reconstructed adjacent intra frames (i.e., previous and subsequent frames temporally adjacent in media content 120), although other side information generating techniques (e.g., use of a previously reconstructed frame, extrapolation, etc.) could also be used. In this implementation, it is assumed that most of the motions in three successive frames are linear and the current. Thus, motion vectors are derived from motion between adjacent two intra frames. In view of this assumption, and in one implementation, decoder 128 determines motion compensation for an X when X is absent. Decoder 128 decodes X's corresponding significance map 124 and applies DWTs to side information Y. In view of the significance map 124, decoder 128 extracts the identified significant coefficients of X from the side information to form coefficient set $Y_s$. Decoder 128 turbo decodes $Y_s$ and the parity bits of X to decode X. In this implementation, these reconstructed WZ frames are presented by media player 132 to a user via display device 134.

An exemplary encoder 116 and decoder 128 architecture is now described.

An Exemplary Wyner-Ziv and Wavelet Video Codec

FIG. 2 shows an exemplary Wyner-Ziv and wavelet video codec architecture, according to one embodiment. For purposes of exemplary description and illustration, the components of FIG. 2 are described with respect to the components of FIG. 1. In the description, the leftmost reference numeral of a component identifies the first figure wherein the component was introduced. For example, DVC encoder 116 and DVC decoder 128 of FIG. 2, respectively represent DVC encoder 116 and DVC decoder 128 of FIG. 1.

Referring to FIG. 2 and block 202, DVC encoder 116 first applies a multi-stage digital wavelet transform (DWT) to an input Wyner-Ziv frame X to generate wavelet coefficient set $X_w$. In this implementation, block 204 applies a uniform scalar quantization with dead zone to quantize coefficients of each sub-band of wavelet coefficient set $X_w$ into M levels. Quantization is explicit, as compared to implicit, for straightforward and flexible content-adaptive adjustment. That is, DVC encoder 116 quantizes the sub-bands of different scales into different respective levels. For example, in one implementation, a lowest sub-band is quantized into 16 levels, and represented by 4 bits. The quantized coefficient set is denoted as $X_q$. At block 206, encoder 116 reorders $X_q$ using set partitioning. To this end, encoder 116 inserts the mapped coefficients into a respective one of significant and insignificant sets of significance map 124. The set partitioning process is performed according to known zero tree structure scanning techniques. The wavelet coefficient reordering process of encoder 116 to identify significant coefficients of a WZ frame is now described in greater detail with respect to FIG. 3.

Figure 3:
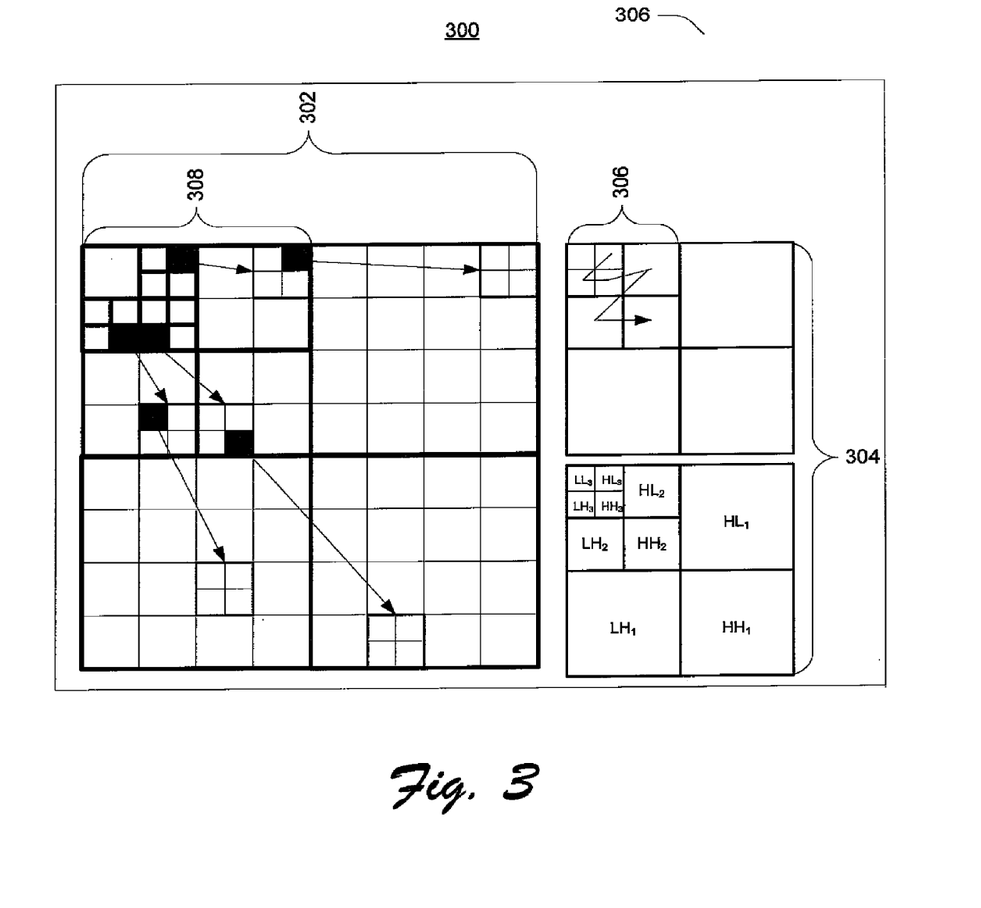
FIG. 3 shows exemplary relations between wavelet coefficients in different frequency sub-bands and scan order used to generate grow zero-trees, according to one embodiment.

FIG. 3 shows exemplary relations between wavelet coefficients in different frequency sub-bands, and encoder scanning order to generate grow zero-trees, according to one embodiment. (Significance map 124 represents the zero-tree scanning result). Square blocks ("blocks") in section 302 represent coefficients from different frequency sub-bands. Each blank block in section 302 represents a parent node. Arrow lines connect parent node and their respective children nodes. Each parent node has four children nodes. Encoder 116 reorganizes the wavelet coefficient set $X_q$ as follows. Encoder 116 scans the quantized sub-bands to evaluate coefficient values level by level. The two compound blocks in section 302 illustrate an exemplary sub-band scan order. In this implementation, parent nodes are scanned before respective children nodes. Another example of scan order is shown in compound block 306 of set 304. In the lower portion of 304, LL, HL, LH and HH represent respective sub-bands after wavelet decomposition and the subscript number represents decomposition level (e.g., $HL_1$, $LH_1$ and $HH_1$ are the HL band, LH band and HH band in the first decomposition scale, respectively). "L" indicates a 'low-pass' sub-band and "H" indicates a 'high-pass' sub-band from one stage of wavelet decomposition.

When encoder 116 scans a node (a quantized coefficient), the node is first put to the significant set X, (shown as significant coefficients 126). Then, encoder 116 inserts a "1" or "0" to the significance map 124 as follows. As shown in section 302, one node 308 corresponds to four children and sixteen grandchildren, etc. If all offspring of the current node are insignificant coefficients (i.e., zero after quantization), this will correspond to "0" in the significance map, and all of the current node's offspring coefficients are set to SKIP mode. SKIP mode indicates that a node is to be skipped (not subsequently transmitted) during the set partitioning process. Otherwise, if all offspring of the current node are significant coefficients (i.e., not zero after quantization), the current node's respective value in the significance map is equal to "one".

Referring to FIG. 2 and block 208, encoder 116 lossless encodes each significance map 124 for set partitioning with an entropy-coding scheme. In this implementation, any conventional entropy coding technique such as the arithmetic coder can be used by encoder 116 to lossless encode a significance map 124. Encoder 116 transmits the coded bits of significance map 124 to decoder 128. In parallel at block 210, encoder 116 inputs coefficients in the significant set into Wyner-Ziv coder 210 portion of encoder 116. In this implementation, Wyner-Ziv coder 210 implements any known Wyner-Ziv encoding scheme. Turbo coder 214 of Wyner-Ziv encoder 210 generates the turbo codes for each Wyner-Ziv frame in view of the frames' significant set. In one implementation, a bit sequence $X_s$ is fed into a convolutional encoder. In parallel, a randomly interleaved version of $X_s$ is used as an input to another convolutional encoder of the same type. Both convolutional encoders output parity bits $X_b$ for communication to decoder 128.

Responsive to receiving an encoded Wyner-Ziv frame and bits for significant map $X_m$, Wyner-Ziv decoder 212 decodes the Wyner-Ziv frame using side information frame Y, which is generated at prediction logic 220 of decoder 128. Side information frame Y is the prediction of X generated from adjacent intra frames. The received bits for significant map $X_m$ are first decoded at logic 222, wherein a DWT with the same number of stages as that used in the encoder 116 (please see component 202) is applied on the side information frame Y. Using $X_m$, decoder 128 extracts the transform coefficients corresponding to the significant set $X_s$. The extracted transform coefficients form the coefficient set $Y_s$. Thus, decoder 128 sends $Y_s$ to Wyner-Ziv decoder 212 to decode the Wyner-Ziv frame together with the received parity bits $X_b$.

Wyner-Ziv decoder 212 successively decodes the coefficients of a sub-band until an acceptable probability of bit error rate is achieved. In one implementation, decoder 128 uses two known soft-input soft-output (SISO) constituent decoders to decode coefficients of a sub-band. Each SISO decoder uses a priori probabilities for $X_b$ and the probabilities calculated from side information $Y_s$ and the corresponding parity bits to calculate extrinsic probabilities and a posteriori probabilities for $X_s$. The iterative decoding is executed by passing the extrinsic probability results of one SISO decoder as the a priori probabilities of the other SISO decoder. Iterations between the two constituent decoders are performed until a satisfactory convergence (e.g., the bit error rate below $10^{-3}$) is reached.

Exemplary Procedure

Figure 4:
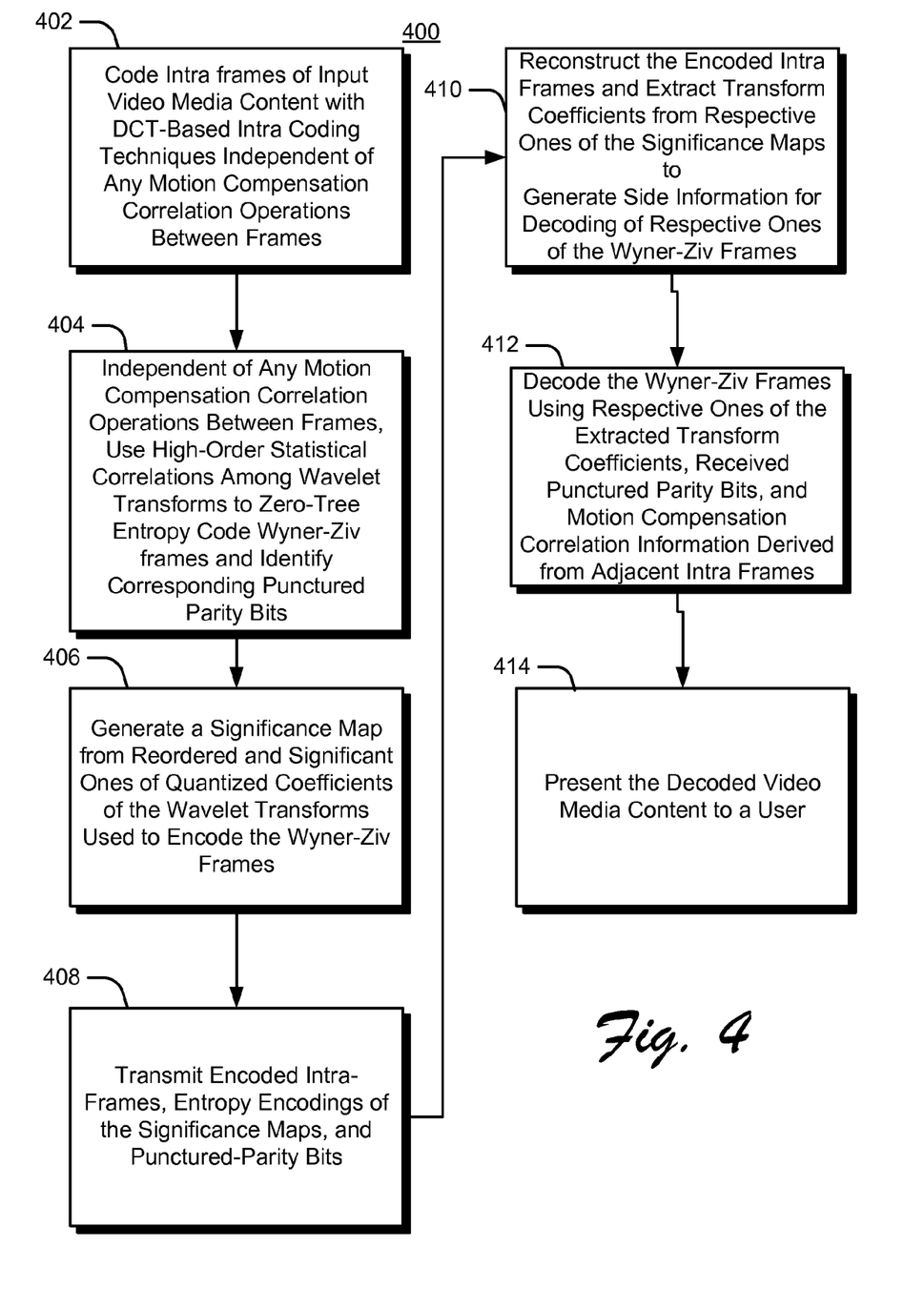
FIG. 4 shows an exemplary procedure for Wyner-Ziv and wavelet video coding, according to one embodiment.

FIG. 4 shows an exemplary procedure 400 for Wyner-Ziv and wavelet video coding, according to one embodiment. For purposes of discussion, the operations of FIG. 4 are described in reference to components of FIG. 1. For instance, in the description, the left-most digit of a component reference number identifies the particular Figure in which the component first appears. Additionally, although the operations of FIG. 4 are shown in a certain numerical order, the operations of one block do not necessarily come before or after the operations of a subsequently numbered block.

The operations of procedure 400 for Wyner-Ziv and wavelet video coding use high-order statistical motion estimation correlations among transform coefficients in a DVC architecture to zero-tree entropy (ZTE) separately encode Wyner-Ziv frames. More particularly, the encoder codes Wyner-Ziv frames using turbo codes. The transform coefficients are quantized using scalar quantization and reorganized into wavelet trees to exploit statistical correlations. Then, significant coefficients are identified and coded for transmission of punctured parity bits to the decoder. The decoder extracts corresponding coefficients from side information, which is generated from surrounding intra frames with the motion-compensated prediction, according to a significance map. The decoder uses these extracted coefficients to reconstruct (decode) the Wyner-Ziv frame for presentation to a user.

More particularly, operations of block 402 code intra frames of input video media content with DCT-based intra-coding techniques independent of any motion compensation correlation operations between frames. Operations of block 404, independent of any motion compensation correlation operations between frames at the encoder 116, use high-order statistical correlations among wavelet transforms to zero-tree entropy code Wyner-Ziv frames and identify corresponding punctured parity bits. At block 406, encoder 116 generates a significance map from reordered and significant ones of quantized coefficients of the wavelet transforms used to encode the Wyner-Ziv frames. At block 408, encoder 116 (or a different computer-program module of computing device 102) transmits encoded intra-frames, entropy encodings of the significance maps, and punctured parity bits to decoder 128 for reconstruction and presentation of the encoded media content to a user.

At block 410, decoder 128 reconstructs the encoded intra-frames and extracts transform coefficients from respective ones of the significant maps to generates side information for decoding respective ones of the Wyner-Ziv frames. At block 412, decoder 128 decodes the Wyner-Ziv frames using respective ones of the extracted transform coefficients, received punctured parity bits, and motion compensation correlation information derived from adjacent intra-frames. Operations of block 414 present the decoded/reconstructed video media content to a user.

CONCLUSION

Although Wyner-Ziv and wavelet video coding has been described in language specific to structural features and/or methodological operations or actions, it is understood that the implementations defined in the appended claims are not necessarily limited to the specific features or actions described. Rather, the specific features and operations discussed above with respect to FIGS. 1-4 are disclosed as exemplary forms of implementing the claimed subject matter.

The invention claimed is:

1. In a distributed video coding architecture, a method at least partially implemented by a computer, the method comprising:

zero-tree entropy encoding Wyner-Ziv frames from multiple frames of source video content to generate encoded Wyner-Ziv content, the zero-tree entropy encoding being based on high-order statistical correlations among wavelet transforms; and communicating: a first portion of the encoded Wyner-Ziv content, comprising only parity bits corresponding to the high-order statistical correlations of the wavelet transforms, to a turbo-decoder portion of a decoder, and a second portion of the encoded Wyner-Ziv content, comprising an entropy encoded map of significant transform coefficients, to a discrete-wavelet-transformer portion of the decoder, for decoding and presentation to a user; wherein communicating the second portion of the encoded Wyner-Ziv content further comprises transmitting the entropy encoded map to the discrete-wavelet-transformer portion of the decoder to generate side information from the entropy encoded map and adjacent ones of intra-coded frames, the side information for reconstruction of the Wyner-Ziv frame.

2. The method of claim 1, wherein zero-tree entropy encoding Wyner-Ziv frames further comprises encoding the Wyner-Ziv frames using turbo codes.

3. The method of claim 1, further comprising operations for:
encoding intra-frames of the multiple frames of source video content with a discrete cosine transform coding algorithm to generate encoded intra-code frame content; and
communicating the encoded intra-code frame content to a prediction logic portion of the decoder for decoding and presentation to the user.

4. The method of claim 1, wherein the entropy encoded map is transmitted to the discrete-wavelet-transformer portion of the decoder in an intra-coding mode.

5. The method of claim 1, further comprising operations for:
encoding intra-frames of the multiple frames of source video content with a discrete cosine transform coding algorithm to generate encoded intra-code frame content; and
communicating the encoded intra-code frame content to a prediction logic portion of the decoder for decoding and presentation to the user, the decoded intra-code frames being presented to a prediction logic;
wherein communicating the second portion of the encoded Wyner-Ziv content further comprises transmitting the entropy encoded map to the discrete-wavelet-transformer portion of the decoder to generate side information from the entropy encoded map and the output of the prediction logic for adjacent ones of the decoded intra-coded frames, the side information for reconstruction of the Wyner-Ziv frame.

6. A computing device comprising:
a processor; and
a decoder comprising:
a turbo decoder, configured to receive only encoded Wyner-Ziv content in the form of parity bits corresponding to the high-order statistical correlations of the wavelet transforms; and
a discrete-wavelet-transformer, configured to receive encoded Wyner-Ziv content in the form of an entropy encoded map of significant transform coefficients and produce side information based at least in part on the entropy encoded map and adjacent ones of intra-coded frames;
wherein the decoder is further configured to reconstruct a Wyner-Ziv frame using the parity bits in view of the side information, wherein the side information is motion vector information interpolated from intra-frame content temporally adjacent in a video sequence to the Wyner-Ziv frame; and
wherein the Wyner-Ziv frame is for presentation to a user.

7. The computing device of claim 6, wherein the content represents a zero-tree entropy encoding of the Wyner-Ziv frame, the zero-tree entropy encoding being based on high-order statistical correlations among wavelet transforms generated from the Wyner-Ziv frame.

8. The computing device of claim 6, wherein the turbo decoder receives the parity bits in Wyner-Ziv coding mode, and wherein the discrete-wavelet-transformer of the decoder receives the entropy encoded map of significant transform coefficients in intra-frame coding mode.

9. The computing device of claim 6, wherein the discrete-wavelet-transformer produces the side information from the interpolated intra-frame content temporally adjacent in a video sequence to the Wyner-Ziv frame and the entropy encoded map of significant transform coefficients.

10. A computer system, comprising:
an encoder comprising:
an entropy-reorder module configured to receive zero-tree entropy encoding Wyner-Ziv frames from multiple frames of source-video content, and generate a first portion of encoded Wyner-Ziv content, the zero-tree entropy encoding being based on high-order statistical correlations among wavelet transform, wherein the entropy-reorder module is also configured to transmit a second portion of the encoded Wyner-Ziv content, comprising an entropy encoded map of significant transform coefficients;
a turbo encoder, configured to receive the first portion of the encoded Wyner-Ziv content, and generate parity bits corresponding to the high-order statistical correlations of the wavelet transforms;
a decoder, coupled to the encoder, comprising:
a turbo decoder, configured to receive the parity bits corresponding to the high-order statistical correlations of the wavelet transforms;
a discrete-wavelet-transformer, configured to receive a second portion of the encoded Wyner-Ziv content, comprising an entropy encoded map of significant transform coefficients and produce side information,
a reconstruction module, configured to reconstruct a Wyner-Ziv frame using the parity bits in view of the side information, wherein the side information is motion vector information based at least in part on the entropy encoded map and adjacent ones of intra-coded frames interpolated from intra-frame content temporally adjacent in a video sequence to the Wyner-Ziv frame, wherein the Wyner-Ziv frame is for presentation to a user.

11. The system of claim 10, wherein the turbo decoder receives the parity bits in Wyner-Ziv coding mode, and wherein the discrete-wavelet-transformer of the decoder receives the entropy encoded map of significant transform coefficients in intra-frame coding mode.

12. The system of claim 10, wherein the discrete-wavelet-transformer of the decoder produces the side information from the interpolated intra-frame content temporally adjacent in a video sequence to the Wyner-Ziv frame and the entropy encoded map of significant transform coefficients.

* * * * *